(12) United States Patent
Fazio et al.

(10) Patent No.: US 9,130,757 B2
(45) Date of Patent: Sep. 8, 2015

(54) METHOD FOR AUTHENTICATED COMMUNICATION IN DYNAMIC FEDERATED ENVIRONMENTS

(75) Inventors: Nelly Fazio, New York, NY (US); Richard Andrew Golding, San Francisco, CA (US); Theodore Ming-Tao Wong, Mountain VIew, CA (US)

(73) Assignee: International Business Machines Corporation, Armonk, NY (US)

( * ) Notice: Subject to any disclaimer, the term of this patent is extended or adjusted under 35 U.S.C. 154(b) by 2016 days.

(21) Appl. No.: 12/189,494

(22) Filed: Aug. 11, 2008

(65) Prior Publication Data

US 2010/0037055 A1 Feb. 11, 2010

(51) Int. Cl.
  *H04L 9/32* (2006.01)
  *H04L 9/08* (2006.01)

(52) U.S. Cl.
  CPC ............ *H04L 9/3255* (2013.01); *H04L 9/3218* (2013.01); *H04L 9/085* (2013.01)

(58) Field of Classification Search
  CPC ........................................................ H04L 9/085
  USPC .......................................................... 713/171
  See application file for complete search history.

(56) References Cited

U.S. PATENT DOCUMENTS

| | | | |
|---|---|---|---|
| 5,610,982 A * | 3/1997 | Micali | 713/157 |
| 5,625,692 A | 4/1997 | Herzberg | |
| 6,209,091 B1 | 3/2001 | Sudia et al. | |
| 6,411,716 B1 * | 6/2002 | Brickell | 380/286 |
| 7,174,460 B2 * | 2/2007 | Horita et al. | 713/176 |
| 2002/0116611 A1 * | 8/2002 | Zhou et al. | 713/156 |
| 2003/0221102 A1 | 11/2003 | Jakobsson | |
| 2005/0131583 A1 * | 6/2005 | Ransom | 700/295 |
| 2005/0204129 A1 * | 9/2005 | Sudia et al. | 713/158 |
| 2006/0023887 A1 | 2/2006 | Agrawal et al. | |
| 2006/0136713 A1 | 6/2006 | Zimmer et al. | |
| 2006/0248334 A1 * | 11/2006 | Ramzan et al. | 713/156 |
| 2008/0292105 A1 * | 11/2008 | Wan et al. | 380/282 |

OTHER PUBLICATIONS

Jianying Zhou; A Fair Non-repudiation P'rotocol; Year: 2002; IEEE; pp. 1-7.*
Anonymous, "News Release: DARPA awards contracts for fractionated spacecraft program," *Defense Advanced Research Projects Agency(DARPA)*, (Feb. 26, 2008).
Beerliova-Trubiniova et al., "Efficient Multi-Party Computation With Dispute Control," in S. Halevi and T. Rabin, editors, *Theory of Cryptography*—TCC 2006, Lecture Notes in Computer Science 3876:305-328 (Mar. 2006).

(Continued)

*Primary Examiner* — Monjour Rahim
(74) *Attorney, Agent, or Firm* — Cantor Colburn LLP; Libby Toub

(57) ABSTRACT

According to one embodiment of the present invention, a method for protecting authenticated communication in dynamic federated environments is provided. The method includes distributing shares of a private signature key to a group of users. When switching from an existing to a new group of users, the method includes producing a plurality of sub-shares from each of the distributed shares of existing users, with each sub-share being accompanied by a corresponding validity proof. The sub-shares from multiple existing users are combined to generate a set of shares for new users, with each new share being derived from sub-shares from multiple existing users.

10 Claims, 7 Drawing Sheets

(56) References Cited

OTHER PUBLICATIONS

Damgard et al., "Non-Interactive Zero-Knowledge From Homomorphic Encryption," in *Theory of Crytography*—TCC, Heidelbert, *Lecture Notes in Computer Science* 3876:41-49 (2006).

Desmedt et al., "Threshold Cryptosystems," *Advances in Cryptology—CRYPTO '89*, LNCS 435:307-315 (1990).

Feldman, P., "A Practical Scheme for Non-Interactive Verifiable Secret Sharing," in *Proc. of the 28th IEEE Ann. Symp. on Foundations of Computer Science*, pp. 427-437 (Oct. 1987).

Ostrovsky et al., "How to Withstand Mobile Virus Attacks," 191 ACM 0-89791-39-2/91/007/0051.

Rivest et al., "A Method for Obtaining Digital Signatures and Public Key Cryptosystems," in *Communication ACM*, 21:294-299 (1978).

Shamir, A., "How to Share a Secret," in *Communications of the ACM*, 22(11):612-613 (Nov. 1979).

Shoup, V., "Practical Threshold Signatures," in *Advances in Cryptology—EUROCRYPT 2000, Lecture Notes in Computer Science*, 1807:207-220 (2000).

Pan et al., "A New Key Management Scheme for Large-Scale MANET", Comp. Intel. and Security, 2006 Int. Conf. on, vol. 2, Nov. 3-6, 2006 pp. 1121-1124.

\* cited by examiner

|  | Computational Cost |
|---|---|
| NIZK generation | 16.25 msec |
| NIZK verification | 17.81 msec |
| SIGN: creat signature fragment | 17.16 msec |
| SIGN: recombine signature | 99.45 - 206.31 msec |
| REDIST | 77.48 msec |

FIG. 5

METHOD FOR AUTHENTICATED COMMUNICATION IN DYNAMIC FEDERATED ENVIRONMENTS

BACKGROUND

The present invention relates to authenticated communication, and more specifically, to authenticated communication in dynamic federated environments.

Some cryptosystems, called "threshold cryptosystems" require a number of parties to cooperate in a decryption protocol in order to decrypt a message. In such systems, a message may be encrypted using a public key and the corresponding private key may be shared among participating parties. A minimum threshold number of the total number of parties must participate in order to decrypt the message. One example of a threshold cryptosystem is a "threshold signature scheme", where a minimum number of parties are required for creating a signature.

Threshold signature schemes enable a group of distributed processes to create cryptographic signatures on messages in a way that does not require any individual group member to know the signature key. Instead, each member process receives a share of the key which it can use to generate signature fragments, and any other process (either member or third-party client) can combine the fragments to generate a complete signature. A minimum threshold number of member processes ought to generate valid fragments in order to enable the reconstruction of complete signatures by other processes.

In threshold signature schemes it is desirable to be able to render the key share of ex-members useless. Proactive signature schemes, a special class of threshold signature schemes where private key shares held by the cluster members can be refreshed by means of an interactive protocol.

Another desirable feature in threshold signature schemes is to be able to grant new shares to incoming members. Verifiable secret redistribution (VSR) is a protocol that redistributes shares of a secret (for example, a private key) from an old set of members to a new, possibly disjoint one, in such a way that new shares cannot be combined with old shares to reconstruct the original secret.

SUMMARY

According to one embodiment of the present invention, a method comprises: distributing shares of a private signature key to a group of users; producing a plurality of sub-shares from each of the distributed shares, with each sub-share being accompanied by a corresponding validity proof; and combining the sub-shares from multiple existing users at each one of a set of new users to generate a set of new shares, each new share being derived from sub-shares from multiple users.

According to another embodiment of the present invention, a method comprises: distributing shares of a private key to a group of computer systems; allowing members of the group to authenticate to at least one client that knows a public key for the group; and redistributing shares from the group to another set of computer systems.

According to a further embodiment of the present invention, a system comprises: a plurality of computer systems, each having a share of a private signature key; the plurality of computer systems each having a means for producing a plurality of sub-shares from each of the shares, with each sub-share being accompanied by a corresponding validity proof; a client computer receiving the sub-shares and the corresponding validity proofs, and generating a set of new shares, each new share being derived from sub-shares from multiple ones of the computer systems; and the client computer redistributing the new set of shares to a new group of users.

According to another embodiment of the present invention, a computer program product for authenticating communications comprises: a computer usable medium having computer usable program code embodied therewith, the computer usable program code comprising: computer usable program code configured to: distribute shares of a private signature key to a group of users; produce a plurality of sub-shares from each of the distributed shares, with each sub-share being accompanied by a corresponding validity proof; and combine the sub-shares from multiple existing users at each one of a set of new users to generate a set of new shares, each new share being derived from sub-shares from multiple users.

BRIEF DESCRIPTION OF THE SEVERAL VIEWS OF THE DRAWINGS

FIG. 5 shows a table of performance parameters in authenticating communications in accordance with an embodiment of the invention;

DETAILED DESCRIPTION

Figure 1:
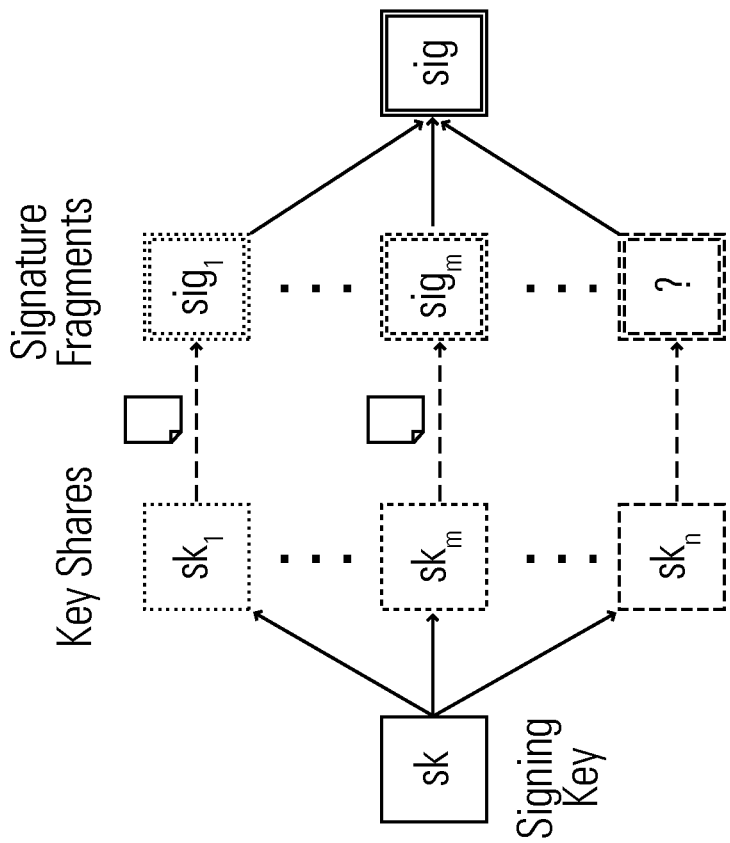
FIG. 1 shows a diagram of a threshold sharing process in accordance with an embodiment of the invention.
Figure 1:
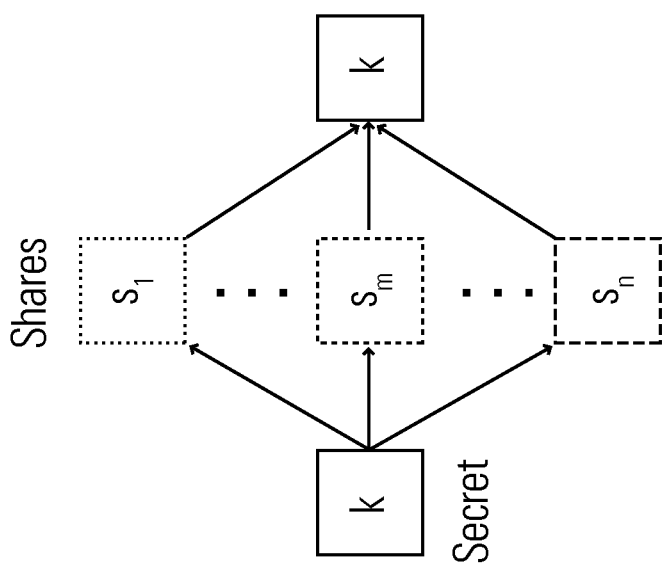

Embodiments of the invention provide service authentication in applications that are structured as dynamically changing federation of distributed agents. One aspect of the invention is a method for verifiable threshold signature redistribution (VTSR) schemes. The invention builds on the work of threshold and proactive signature schemes, and on VSR protocols, but it overcomes the limitations of alternative solutions based only on threshold and proactive signature schemes and on VSR protocols (discussed above) by integrating efficient techniques for Non-Interactive Zero-Knowledge (NIZK) proofs and for Dispute Control.

Embodiments of the invention have the ability to redistribute shares of a private key from old cluster to a new set of agent workers, so that signature fragments created with old key shares cannot be combined with fragments created with new key shares to generate a valid signature.

Embodiments also incorporate a verification capability that enables replacement workers to confirm that they have received valid shares of the private key. In particular, the protocol includes a phase for catching malicious old agents that try to cause new agents to receive bogus shares that would generate signature fragments which cannot be combined together to generate a proper signature.

Embodiments of the invention also offer improvements over solutions based on VSR protocols in terms of both functionality and efficiency. In terms of functionality, the improvement over the state of the art results from a distributed signature generation method. With the present invention, the signing key is split into key shares that can individually be used to generate signature fragments. A complete signature can then be recovered by recombining m-out-of-n valid signature fragments. Thus, with the present invention, there is no point in time when the secret signing key is entirely stored at a single place in the system.

As for efficiency, embodiments of the invention may dramatically reduce the amount of work necessary in the redistribution phase to verify the correctness of the redistributed shares. In solutions based on prior art, such verification may have required expensive combinatorial checks that could lead to a run-time exponential in the number of agents in the cluster. The present invention may employ non-interactive zero-knowledge (NIZK) proofs and other verification techniques to guarantee a worst-case run-time that is only polynomial in the cluster's size. A short analysis of the expected computation time for various phases of the new scheme shows that the NIZK-related steps do not create a bottleneck for the system, as they are an order of magnitude faster than some of the signature-related operations (discussed in more detail below).

Furthermore, embodiments of the present invention have dynamic capabilities to permit the adjustments to the quorum requirements, "on the fly", without reinitialization. That is redistribution does not require reconstruction of the whole private signing key from the individual shares, thus avoiding the security hazard of reconstructing the whole signing private key at a single point.

The present invention may be used in a number of different applications, including, but not limited to secure communication in dynamic airborne environments, earth observation systems, information database storage systems, secure satellite communications for satellite clusters, and other secure communications applications in dynamic federated environments.

The following section will discuss one of these applications, where the invention is used in the software architecture for a fractionated satellite system. The goal of such fractionated satellite systems is to increase the value and flexibility of satellite missions by moving away from monolithic satellite single-architectures to clustered multi-satellite architectures. Such multi-satellite architectures can yield increased value by enabling incremental scale-up of the cluster size in response to changing mission resource requirements, and by providing some mission capability even with only partial system deployment, or in the face of individual satellite failures. They can also enable missions that cannot be accomplished with monolithic architectures due to maximum launch size and mass constraints on satellites. In contrast, monolithic architectures must provide sufficient resources to cover all potential mission requirements, which often lead to increases in satellite size, mass, and design complexity. Moreover, monolithic architectures provide no mission capability before complete system deployment or after a satellite failure. Many of the benefits one can obtain from the transition to fractionated satellite systems have clear analogs in the transition away from mainframe to distributed computer systems.

A feature of embodiments of the present invention is a protocol to support applications that are structured as federations of distributed "agents". As used in the context of a fractionated satellite system, the term "agent" means an application thread or a process running on one of the processors aboard a satellite. An application may have multiple "worker" agents that span a cluster of satellites. For example, in an earth-observation system comprising several camera-enabled satellites, the imaging application may have an agent running on each satellite to gather and process images from the local camera. The workers federate by electing one of their members as a "manager" agent that handles application-wide operations, e.g., in the earth-observation system, the manager would process images from workers to synthesize higher-resolution images, and control the main space-ground data communication downlink. The manager maintains the current view of live workers, detecting failed workers through a heartbeat mechanism. A manager must be able to exchange heartbeat messages with a quorum of workers; otherwise, it ceases being the manager. The size of the quorum is an application-specific parameter. Workers detect a failed manager with the same heartbeat mechanism, and can re-elect a new manager if the old one stops exchanging heartbeat messages with them.

Embodiments of the invention include a federation protocol that incorporates a threshold public-key signature scheme to help defend against Byzantine (arbitrary) agent failures. When an administrator sets up the initial cluster of application workers, it creates a public/private key pair and distributes shares of the private key to the worker agents using a threshold sharing scheme. Each worker can use its share to generate a signature fragment on a message. A client of the application can combine a quorum of such fragments to generate a complete signature on a message, and use the public key to verify the signature. Alternatively, the manager can perform the signature reconstruction on behalf of the clients, thus ensuring compatibility with legacy clients that are only able to process traditional, non-threshold public-key signatures. This mechanism can also be used by a client or a worker to verify that the current manager can in fact exchange heartbeat messages with a quorum of workers. Thus, an operational manager with a quorum can obtain enough signature fragments to generate a complete signature for any challenge message sent by the client/worker, but a faulty manager without a quorum cannot.

An important requirement of the federation protocol is for a method of revoking shares of private keys from failed workers, and of issuing new shares to replacement workers. Existing technologies provide some useful building blocks for these methods, but in and of themselves do not form complete solutions. These technologies include proactive signature schemes and a verifiable secret redistribution (VSR) protocols.

Proactive signature schemes are a special class of threshold signature schemes, where the private key shares held by the cluster members can be refreshed by means of an interactive protocol. Proactive signature schemes, however, do not offer a way to invalidate shares of revoked members, nor do they lend themselves easily to the distributed generation of new shares for replacement members.

The VSR protocol redistributes shares of a secret (here, a private key) from an old set of members to a new, possibly disjoint one, in such a way that new shares cannot be combined with old shares to reconstruct the original secret. A drawback of the protocol is that verification of the correctness of the new shares after redistribution has a computational time that is exponential in the size of the set of old members. Another drawback is that the protocol does not work well with existing threshold public-key signature schemes; members must temporarily reconstruct the private key to generate signatures, which has obvious problems with vulnerability.

In accordance with one embodiment of the present invention, three procedures are used to achieve authenticated communication in dynamic federated environments. The three procedures are called herein "INIT", "SIGN", and "REDIST".

The INIT procedure is used to distribute shares of a new private signature key to a group. It establishes a private/public key pair for the group, splits the private key among the initial group members via an m-out-of-n threshold sharing scheme, and sets up additional parameters that will be used in conjunction with validity proofs to validate the computations carried out by the SIGN and REDIST algorithms.

The SIGN procedure enables group members to authenticate to clients who know the group public key. Each active member of the group produces a signature fragment, along with a corresponding NIZK validity proof, and sends them both to the invoking client. When collecting these signature fragment/NIZK proof pairs, the client will discard any fragment for which the validity proof does not check out. The integration of NIZK validity proofs removes the need to consider all possible size-m subsets of the n shares till successful reconstruction of the secret, which instead would be necessary in the case of alternative solutions based only on prior systems. In this way, the client can efficiently reconstruct a complete signature even in the presence of several subverted group members.

The REDIST procedure is used to redistribute signing shares from the current set of members to a new set. This procedure occurs in three steps: the first step is to select a core set among the current members that will carry out the distribution of new shares to the members of the new set. The second step consists of the core set actually generating new sub-shares and delivering them to all the members of the new set, along with a proof of correctness. The third step is for members of the new set to collect the sub-shares generated by the core set, and combine the sub-shares into a new set of shares, each new share being derived from sub-shares from multiple users. The third step also comprises the verification of the validity of the newly received share. Note that, the first step of REDIST (i.e., the choice of the core subset that will carry out the redistribution of the signing key share) is implemented with the use of the Dispute Control technique (described in more detail below). The goal of dispute control is to reduce the frequency of faults, by localizing each pair of disputing players (at least one of whom is corrupted) whenever a fault is observed and preventing this pair from participating to the redistribution phase any longer. Doing so avoids having to pick a new core set from scratch every time a fault is detected during the redistribution phase.

FIGS. 1-4 present a high-level illustration of the INIT, SIGN and REDIST processes in accordance with an embodiment of the invention. Referring now to FIG. 1 there is shown a diagram of the basic concept of threshold sharing as used by embodiments of the invention. At the left side of FIG. 1, a private key k is split into separate fragments of the keys, or shares labeled $s_1, \ldots, s_m, \ldots, s_n$. These shares may be distributed to individual users. The shares may then be combined to produce the original private key k. At the right side of FIG. 1, a similar process is depicted with the key k being replaced by a signing key sk. Each user receives a key share of the signing key, shown as $sk_1, \ldots, sk_m, \ldots, sk_n$. Each user also receives a document and signs the document resulting in signature fragments, $sig_1, \ldots, sig_m, \ldots, sig_n$. The signature fragments may then be combined to produce the complete signature, sig. One issue with this configuration is that if one of the users is malicious, the corresponding signature fragment may be incorrect, shown by the question mark. It is desirable to be able to detect the presence of the incorrect signature fragment.

Figure 2:
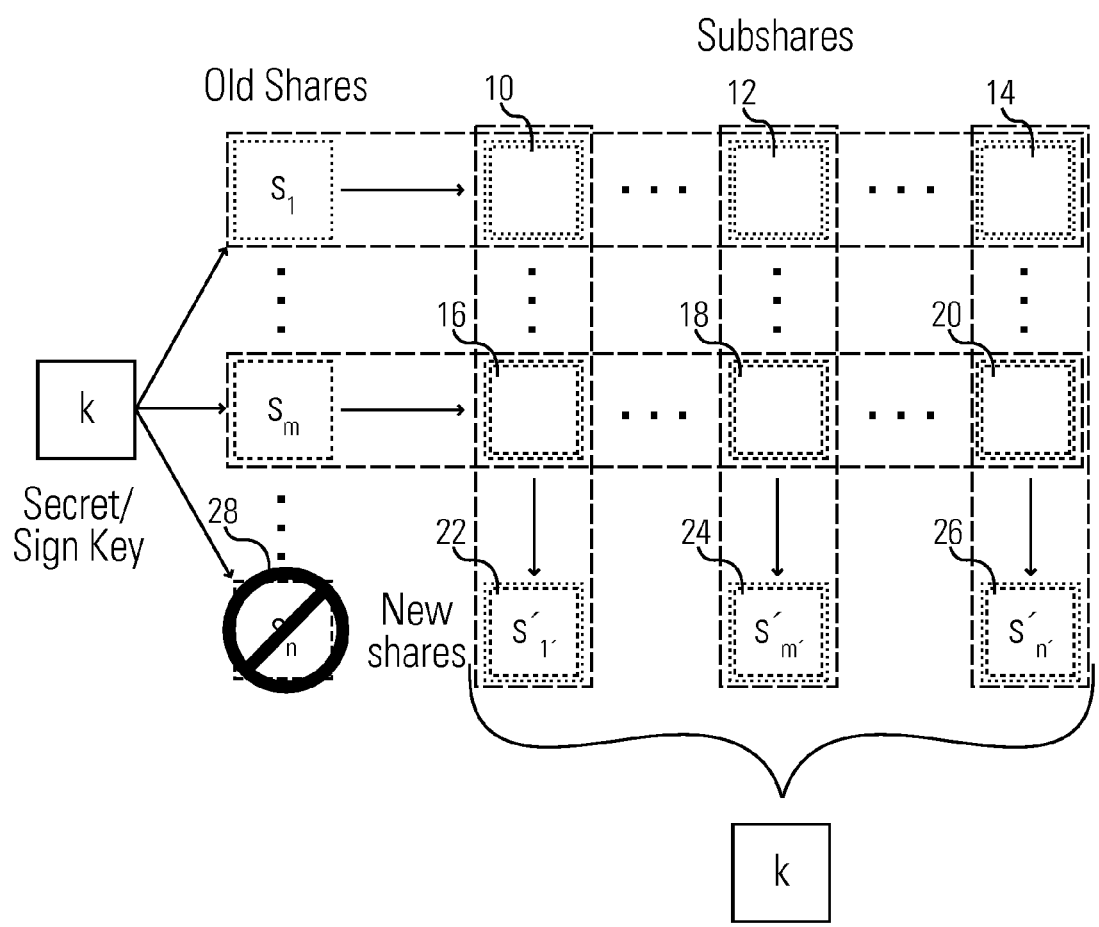
FIG. 2 shows a diagram of a redistribution of key shares process in accordance with an embodiment of the invention.

FIG. 2 shows a technique for redistributing shares of a private key, or a sign key, to a new set of users. In particular, a key k is split into individual key shares, $s_1, \ldots, s_m, \ldots, s_n$, as shown in FIG. 1. A first user, with share $s_1$ then divides up its share into sub-shares, 10, 12 and 14. Likewise, another user, $s_m$ divides up its share into sub-shares, 16, 18 and 20. It will be appreciated that only two users and three sub-shares are illustrated but that a large number of users and sub-shares may be used in various embodiments of the invention. The manner in which the sub-shares are divided up by the users may be defined by a particular protocol.

The sub-shares are then combined as follows. The sub-shares in the first column, such as sub-shares 10 and 16 are combined to form a first new share $s'_1$. The sub-shares in the second column, such as 12 and 18 are combined to form new share $s'_m$, and so on, until all n new shares have been formed. The new shares may then be distributed to a new set of users. In particular, a first new user may receive new share $s'_1$, a second new user may receive new share $s'_m$, and so on. The sub-shares are formed such that when all the new shares are combined the original key k may be produced. As a threshold scheme it is noted that not all users must participate to produce the original key. This shown by the old share $s_n$ of one user, share 28, who does not participate, but does not prevent the original key k from being generated.

Figure 3:
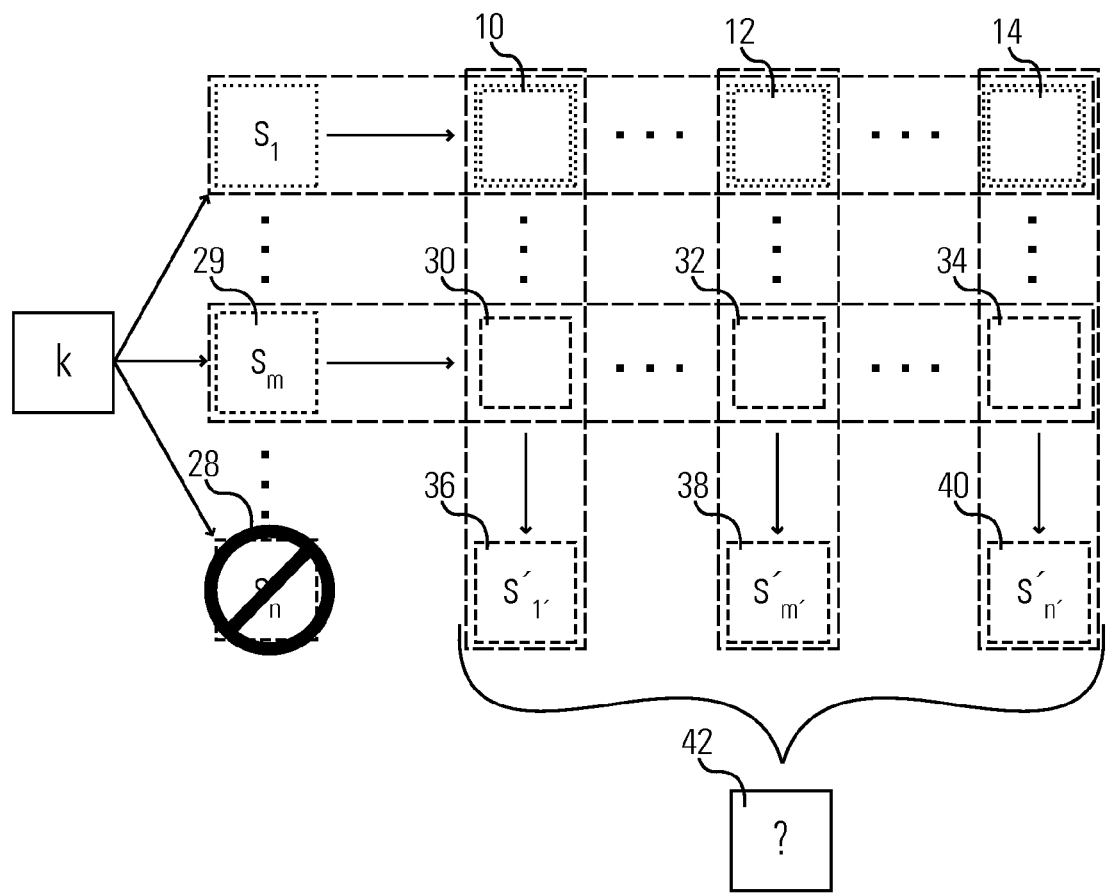
FIG. 3 shows a diagram of a process for the redistribution of key shares with failed shares in accordance with an embodiment of the invention.

FIG. 3 shows another diagram of a technique for redistributing shares of a private key. As shown in FIG. 2, a first user receives a share of key k, $s_1$ and splits that share into multiple sub-shares 10, 12 and 14. In this instance, however, a malicious user 29 splits up its share of k, $s_m$, into multiple sub-shares 30, 32 and 34. Malicious user 29, however, does not use the correct protocol for splitting up the share into sub-shares as do the legitimate users. As a result, the final new shares 36, 38 and 40 will not combine correctly to form the original key, and instead will produce a useless key 42. In this way a malicious user 29 may be able to prevent the legitimate users from extracting the original key, k.

Figure 4:
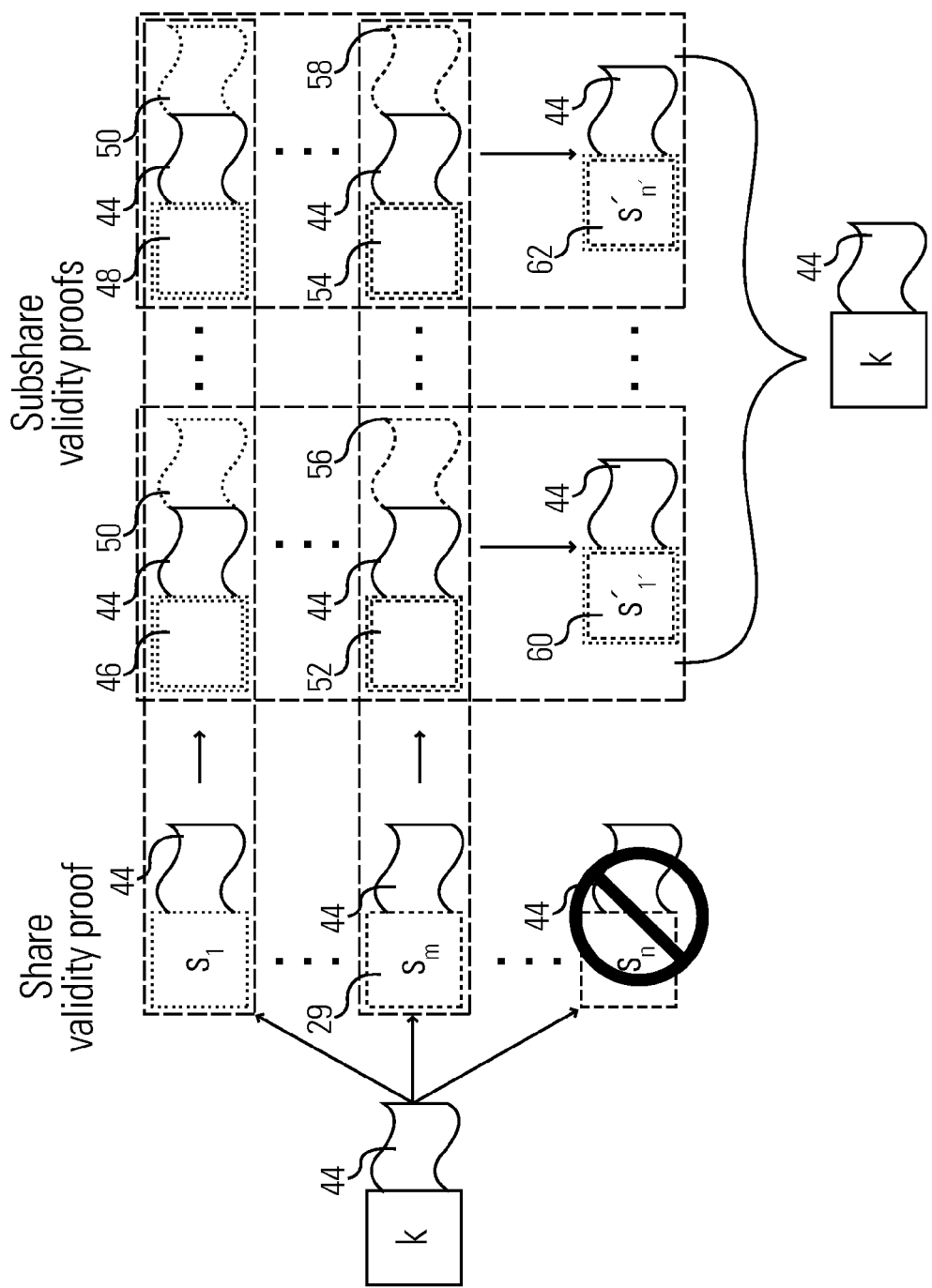
FIG. 4 shows a diagram of a process for the redistribution of key shares with validity proofs in accordance with an embodiment of the invention.

FIG. 4 shows a diagram of a technique for redistributing shares of a private key in accordance with an embodiment of the invention. This technique addresses the above-mentioned problems that result from the presence of malicious users who either generate incorrect sub-shares, or who do not generate sub-shares at all such that the legitimate users may still extract the original key k. The original key k has a validity proof 44 attached to it. This may be, for example a NIZK validity proof as discussed in more detail below. This proof 44 is attached to each of the shares $s_1, \ldots, s_m, \ldots, s_n$.

A first user may then divide up the share $s_1$ into a plurality of sub-shares, such as sub-shares 46 and 48. This may be done in a manner similar to the technique shown in FIG. 3, except that each sub-share will have a new proof appended to it. In particular, sub-share 46 will have a concatenation of the original validity proof 44 and a new sub-share validity proof 50 appended to it. Likewise, sub-share 48 will have appended to it a concatenation of the original validity proof and a new sub-share proof 54, and so on for each sub-share. In a similar manner a second user may receive a second key share $s_m$ 29 with validity proof 44 attached to it. The second user may then generate sub-shares, 52 and 54, each having the original validity proof attached to it along with a new sub-share validity proof 56, 58 appended to it.

As a result, all of the sub-shares in the first column may be combined to form new shares 60 and 62. Note that each of the new shares 60, 62 may have the original validity proof 44 appended to it. Each new share, such as 60 and 62, may then be distributed to a new set of users and combined by them to extract the original key k with the original validity proof 44 attached to it. This configuration will still yield the correct original key k, even in the case of the two kinds of previously mentioned attacks, where a user does not contribute and where a user contributes incorrect sub-shares.

The following discussion will provide further technical details of the INIT, SIGN and REDIST procedures in accordance with an embodiment of the invention. As a preliminarily matter, we first discuss notation. Consider a trusted dealer and a set P of m players, indexed $i=1, \ldots, m$. We assume at most t of the players are corrupted and that k signature fragments are sufficient to obtain a valid signature, where $k=t+1$ and $m \geq 3t+1$. Let p, q be two random primes of equal length, such that $p=2p'+1$ and $q=2q'+1$; let $n=pq$ and $n'=\phi(n)/4=p'q'$. In what follows, $Z_n^*$ denotes the multiplicative group of integers modulo n, while $Q_n$ denotes the subgroup of quadratic residues of $Z_n^*$. Moreover, during each time period z, we let $\delta_z=k!$, where k is the number of signature fragments needed to reconstruct a complete signatures during period z, while $$\Delta_z = \Pi_{u=1}^{z} \delta_u.$$

Definition 1: An access structure $\Gamma_P^{m,k}$, where $m=|P|$ and $k \leq m$, is a collection of subsets of P of size exactly k.

The following section will discuss the NIZK Proofs. Let R be a relation for which one can efficiently check whether a pair (x,w) is in R or not. Let $1^\kappa$ be a security parameter such that the lengths of x and w are polynomial in κ. Let $L_R = \{x | \exists w : (x,w) \in R\}$.

A non-interactive zero-knowledge (NIZK) proof system (in the R.O.M.) for R is a triple of efficient algorithms (P, V, S), all having access to a common random oracle O(•), where:

$P^O(•)(1^\kappa,x,w)$ is a probabilistic algorithm run by a prover. It takes as input x and w such that $(x,w) \in R$, and outputs a string Π as a non-interactive zero-knowledge proof that $x \in L_R$;

$V^{O(•)}(1^\kappa,x,\Pi)$ is a deterministic 0/1-valued algorithm run by a verifier, satisfying the following correctness property: for all K-instances x and w such that $(x,w) \in R$, it holds that:

$$Pr\left[V(1^\kappa, x, \pi) = 1 \mid \pi \xleftarrow{r} P(1^\kappa, x, w)\right] = 1$$

where the probability is over the choice of O and the random coins of P;

$S^{O(•)}(1^\kappa,x)$ is a probabilistic algorithm (known as simulator). It takes as input an $x \in L_R$, and outputs a simulated proof $\bar{\pi}$ and a simulated oracle $\bar{O}(•)$;

SOUNDNESS: For any probabilistic polynomial-time algorithm $\bar{P}$, and any $x \in L_R$:

$$Pr\left[V^{O(•)}(1^\kappa, x, \pi) = 1 \mid \pi \xleftarrow{r} \bar{P}^{O(•)}(1^\kappa, x, w)\right]$$

is negligible in K, where the probability is over the choice of O and the random coins of P;

ZERO-KNOWLEDGE: For any probabilistic polynomial-time 0/1-valued algorithm D, and any $(x,w) \in R$:

$$\left| Pr\left[D^{O(•)}(1^\kappa, x, \pi) \mid \pi \xleftarrow{r} P^{O(•)}(1^\kappa, x, w)\right] - Pr\left[D^{\bar{O}(•)}(1^\kappa, x, \pi) \mid (\pi, \bar{O}(•)) \xleftarrow{r} S(1^\kappa, x)\right] \right|$$

is negligible in κ, where the probability is over the choice of S.

Consider a prover P and a verifier V, both of which get a Decisional Diffie-Hellman (DDH) tuple $(g_1, g_2, h_1, h_2)$ as common input, where $g_1, h_1 \in Q_n$, and $g_2 = g_1^w \mod n$, $h_2 = h_1^w \mod n$, for some $w \in Z_{n'}$. Additionally, P gets w as private input.

Let L(n) be the bit-length of n and let H' be a hash function, whose output is an $L_1$-bit integer, where $L_1$ is a secondary parameter (say, $L_1=128$). To construct a proof of correctness Π, P selects a random number $r \in \{0, \ldots, 2^{L(n)+2L_1}-1\}$ and computes:

$$g' = g_1^r \mod n, \ h' = h_1^r \mod n$$

$$c = H'(g_1, g_2, h_1, h_2, g', h')$$

$$z = wc + r$$

The proof of correctness Π is (z, c).

To verify the validity of Π, verifier V checks that:

$$c = H'(g_1, g_2, h_1, h_2, g_1^z \cdot g_2^{-c}, h_1^z, h_2^{-c}).$$

The notion of dispute control has been discussed in the prior art as a means to reduce the frequency of faults that can occur during the execution of a multi-party computation protocol. Briefly, the idea is to publicly localize a pair of disputing players (at least one of them corrupted) whenever a fault is observed, and preventing this pair from getting into dispute ever again. Hence, the number of faults that can occur during the whole protocol is limited to be t(t+1).

As discussed above, in one embodiment of the invention, authenticated communication is achieved using three procedures: INIT, REDIST, and SIGN.

In the INIT procedure, the dealer chooses two random primes p, q of equal length, such that $p=2p'+1$ and $q=2q'+1$, where p', q' are also prime. Let $n=pq$ and $n'=\phi(n)/4=p'q'$. The dealer also selects a prime $e>m$ and computes the value $d \in Z_{n/4}^*$, such that $de \equiv 1 \mod n'$. The pair (n, e) constitutes the public key of the system: it will remain the same during the entire lifetime of the system. Then, the dealer selects a k-degree polynomial $F_0(•) \in Z_{n/4}^{\leq k-1}$ subject to $F_0(0) = d$.

To distribute secret d, we use Shamir's threshold secret sharing. More specifically, for each player i, the dealer computes the value $s_i = F_0(i)$ and delivers it to player i via a private channel. The dealer also chooses a random value $g \in Q_n$, and sets the public information of time instant O to be $$PUB_0 = (g^{F_0(a_0)}, g^{F_0(a_1)}, \ldots, g^{F_0(a_{k-1})})$$

where $a_0 = 0$ and $a_1, \ldots, a_{k-1}$ are special indexes, never assigned to any user joining the system.

Finally, using secret value d, the dealer produces an RSA signature $\Sigma_0$ on $PUB_0$ as $\Sigma_0 = H(PUB_0)^d$, where H is a hash function mapping messages to elements of $Z_{n'}^*$.

Each player i can verify the authenticity of the public information by checking signature $\Sigma_0$ with the RSA public key (n, e).

Let $\epsilon_0 = k!$ and $b^*_{il} = \delta_0 b_{il}$, where $$b_{il} = \prod_{\substack{j=1 \\ j \neq l}}^{k-1} \frac{i - a_j}{a_l - a_j}, l = 0, \ldots, k-1. \quad (1)$$

By definition, $b^*_{il}$ is an integer value. Each player i stores the secret value $s_i$ and the public information $PUB_0$. Note that player i can verify the validity of the received secret value $s_i$ by checking that:

$$g^{\delta_0 s_i} = \prod_{l=0}^{k-1} (g^{F_0(a_l)})^{b_{il}^*}. \quad (2)$$

Test in Equation (2) is very similar to the one in Feldman's Verifiable Secret Sharing scheme, used by the shareholders of a secret to verify the validity of their shares.

REDIST: To redistribute the secret d at time z from $\Gamma_P^{m,k}$ to the new access structure $\Gamma_{P'}^{m',k'}$, a set $B \in \Gamma_P^{m,k}$ is selected to guide the evolution of the public information from $PUB_{z-1}$ to $PUB_z$.

Remark 1 To select a set B, we can either select k random users in P, or establish a lexicographical order in P and select the first k players in the list. If the chosen set B contains a corrupted player j, we will replace j (via the technique of Dispute Control) with another player from P, until none of the players in B is corrupted.

Since set P' may contain new users, each player $i \in P$ starts by broadcasting the signature $\Sigma_{z-1}$ on the public information $PUB_{z-1}$ to all users in P', as a proof of validity of $PUB_{z-1}$.

Each player $j \in B$ runs an instance of Shamir's threshold secret sharing scheme to distribute its own secret share $s_j$ to the players in P'. More precisely, user j selects a random k'-degree polynomial $f_j(\cdot) \in Z_{n/4}^{\leq k'-1}$ subject to $f_j(0) = s_j$. User j now broadcasts values $g^{f_j(0)}, g^{f_j(a_1)}, \ldots, g^{f_j(a_{k'-1})}$, which will be later used to compute the new public info $PUB_z$.

For each $i' \in P'$, user j computes sub-share $s_{ji'} = f_j(i')$, and delivers this value to player i' (over a private channel).

Let $\delta_{z-1} = k'!$ and $b_{jl}^* = \delta_{z-1} b_{jl}$, $l=0, \ldots, k'-1$. To compute its new sub-share, player i' first verifies the validity of $g^{f_j(0)}$ by checking that:

$$(g^{f_j(0)})^{\delta_{z-1}} = \prod_{l=0}^{k-1} (g^{F_{z-1}(a_l)})^{b_{jl}^*} \quad (3)$$

which, by Equation (2) written for point j and $PUB_{z-1}$, must hold true if player j broadcasts the correct value for $g^{f_j(0)}$.

Then, player i' verifies validity of $s_{ji'}$ by checking that:

$$\forall j \in B: g^{\delta_z s_{ji'}} = \prod_{l'=0}^{k-1} (g^{f_j(a_{l'})})^{b_{i'l'}^*}. \quad (4)$$

If, for some $\bar{j} \in B$, test in Equation (4) fails, then $\bar{j}$ is removed from B (and $\bar{i}$ too, if $\bar{i} \in B$); we then select a fresh player from P to provide the redistribution of its sub-share as described above. To guarantee termination, we also mark player $\bar{j}$ and $\bar{i}$, so we will not put them back in B in subsequent rounds of the current execution of the redistribution protocol.

Player i' can now compute its new sub-share as:

$$s'_{i'} = \sum_{j \in B} c_j^* s_{ji'}, \quad c_j^* = \delta_{z-1} \prod_{l \in B \setminus \{j\}} \frac{l}{l-j}. \quad (5)$$

We now describe how the new public information $PUB_z$ is generated. For $0 \leq l' \leq k'-1$, player $i' \in P'$ computes the values:

$$g^{F_z(al')} = \prod_{j \in B} (g^{f_j(al')})^{c_j^*}. \quad (6)$$

The new public information is set to be $$PUB_z = (g^{F_z(0)}, g^{F_z(a_1)}, \ldots, g^{F_z(a_{k'-1})}).$$

The final step of the REDIST protocol produces a signature for the newly created public information $PUB_z$, using the just distributed shares $s'_{i'}$ for $i' \in P'$.

Let $\Delta_z = \prod_{u=1}^{z} \delta_u$; notice that, by construction, it holds that $F_z(0) = \Delta_z F_0(0) = \Delta_z d$.

Let $x = H(PUB_z)$ and $\tilde{x} = x^4$; each $i' \in P'$ uses the new sub-share $s'_{i'}$ to compute a fragment signature on $PUB_z$ as $\sigma_z^{(i')} = x^{2\delta_z s'_{i'}}$. Player i' broadcasts $\sigma_z^{(i')}$ to all other players in P', along with an associated non-interactive zero-knowledge (NIZK) proof $\pi_z^{(i')}$ that $(g, g^{\delta_z s'_{i'}}, \tilde{x}, (\sigma_z^{(i')})^2)$ is a Decisional Diffie-Hellman (DDH) tuple.

Each player $i' \in P'$ determines a set of at least k' signature fragments with a valid associated NIZK proof; these valid fragments can be used to derive a complete signature $\Sigma_z = H(PUB_z)^d$ as follows: First, i' recombines these values into:

$$\begin{aligned} W_z &= \prod_{j \in S} [(\sigma_z^{(j)})^2]^{b_j^*} \\ &= \prod_{j \in S} (H(PUB_z)^{4\delta_z s'_j})^{b_j^*} \\ &= (HPUB_z)^{4\delta_z s'_j b_j^*} \\ &= (HPUB_z)^{4\delta_z s_j^*)\sum_{j \in S} b_j^* s'_j} \\ &= (HPUB_z)^{4\delta_z F_z(0)} \\ &= (HPUB_z)^{4\delta_z \Delta_z} \\ &= \Sigma_z^{4\Delta_z \Delta_z} \end{aligned} \quad (7)$$

where $$b_j^* = \delta_z \prod_{i \in S \setminus \{j\}} \frac{i}{i-j}.$$

Then, each player $i' \in P'$ can now recover $\Sigma_z$ from $W_z$, using the following standard technique. Let $e' = 4\delta_z \Delta_z$; it holds that $W_z = \Sigma_z^{e'}$. As $ed = 1 \mod n'$, we also have $H(PUB_z) = \Sigma_z^e$. Now, since e is chosen as a large prime and e' only has small factors, it holds that $\gcd(e', e) = 1$, and so, by the extended Euclidean algorithm, we get integers $\alpha, \beta$ such that $e'\alpha + e\beta = 1$. Thus, i' can compute $\Sigma_z$ as:

$$W_z^\alpha \cdot (H(PUB_z))^\beta = \Sigma_z^{e'\alpha} \cdot \Sigma_z^{e\beta} = \Sigma_z^{e'\alpha + e\beta} = \Sigma_z \quad (8)$$

Notice that each player $i' \in P'$ can verify the correctness of the signature $\Sigma_z$ so computed by checking that:

$$\Sigma_z^e = H(PUB_z).$$

At this point, each $i' \in P'$ commits its new share $s'_{i'}$, completing the REDIST protocol.

SIGN: When a client requests a signature on a message M during time period z, as a preliminary step, each player $i \in P$ sends a copy of the signature $\Sigma_z$ on the current public information $PUB_z$.

Then, each $i \in P$ creates a fragment signature $\Sigma_z^{(i)} = H(M)^{2\delta_z s_i}$ on message M, and sends it back to the client, together with an associated NIZK proof $\Pi_z^{(i)}$ that $(g, g^{\delta_z s_i}, \tilde{x}, (\Sigma_z^{(i)})^2)$ is a DDH tuple. Using public info (n, e) (stored in the client's ROM), the client can verify the validity of $\Sigma_z^{(i)}$, and then compute values $g^{\delta_z s_i}$ via Equation (2).

Finally, the client determines a set S of k valid fragment signatures and recombines them into a complete signature $\Sigma$ on M as described in the REDIST phase.

We now present a short analysis to estimate the computational cost of the SIGN and REDIST procedures. (We omit an analysis for the INIT procedure, since its cost is incurred only once; we just observe that the presence of a central dealer during system initialization only makes things computationally easier, so that INIT is the cheapest phase of our protocol.) Peeking ahead, we notice that the NIZK-related steps do not create a computational bottleneck for the system; in fact, the modular arithmetic necessary for correct signature reconstruction turns out to use the largest cost share (by roughly an order of magnitude).

We will be assuming primes p and q of 512 bits, which is typical of RSA-based cryptosystems. Let $\lambda$ denote the bit-length of the RSA modulus n=pq, i.e., $\lambda = |n| = 1024$. Recall that raising a value $\alpha \in Z^*_n$ to a power e can be done without knowledge of the factorization of n in time $O(|e||n|^2)$.

To provide an analysis independent of the specific hardware/software architectures in which our application will run, we express run-time for the various operations in our protocol in terms of time to compute a modular exponentiation with exponent size $\text{len}(e) = \lambda$, and modulus size $\text{len}(n) = \lambda$. For the sake of concreteness, however, it is useful to bear in mind that on a 1.5 GHz CPU with 1.5 GB RAM, an unoptimized, open-source software implementation leads to value of X in the order of 13 msec.

We start by analyzing the cost of generating and verifying a NIZK proof as discussed above. The most expensive step in the generation of a NIZK proof is the computation of two exponentiations (for g' and h') with exponent r and modulo n, where $|r| = 1024 + 2*128 = 1280$ bits and $|n| = \lambda$. Additional steps consist of computing a hash function with a 128-bit output (to compute c), and summing integer values (to compute z), which both add a negligible cost with respect to the computation of an exponentiation:

$$T(NIZK\text{-}Gen) \approx T(g') + T(h') \approx O(1280\lambda^2) \approx 1.25X.$$

To verify the validity of an NIZK proof, we need to compute two exponentiations with a 128-bit exponent and $\lambda$-bit modulus $(g_2^{-c}, h_2^{-c})$, two exponentiations with a 1280-bit exponent and a $\lambda$-bit modulus $(g_1^z, h_{12}^z)$, and a hash function with a 128-bit output. Again, the computation of a hash function is negligible with respect to the time to compute an exponentiation.

$$T(NIZK\text{-}Ver) \approx T(g_2^{-c}) + T(h_2^{-c}) + T(g_1^z) + T(h_1^z)$$

$$\approx O(128\lambda^2) + O(1280\lambda^2)$$

$$\approx (0.12 + 1.25)X$$

$$\approx 1.37X.$$

We now analyze the running time of the SIGN procedure, distinguishing between the cost of generating signature fragments, which is incurred by each individual player in P, and the cost of recombining the fragments into a stand-alone signature, which is incurred by the client (or by one of the players on behalf of the client).

Each player $i \in P$ creates a signature fragment $\Sigma_z^{(i)}$, which requires one exponentiation modulo n. An upper bound on the size of $\delta_z$ is k log k, while the bit-length of the player's share $s_i$ (computed according to Eq. 5) is at most $\lambda + 2k \log U + \log k$, where U is an upper bound on the number of satellites (or other computer systems in non-satellite applications) in production (say, U=256), m is the typical size of the cluster (e.g., m=10), and k denotes the number of valid signature fragments sufficient to reconstruct a valid signature (e.g., k=4). An upper bound on the length of the exponent is thus $\lambda + 2k \log U + (k+1) \log k$.

$$T(\sum_z^{(i)}) \approx O((\lambda + 2k\log U + (k+1)\log k)\lambda^2) \approx \approx 1.07X.$$

Additionally, each $i \in P$ generates an NIZK proof which, as shown above, takes time $T(NIZK\text{-}Gen) \approx 1.25X$, so the generation of a signature fragment takes roughly time:

$$T(SIGN\text{-}FRAGMENT) \approx T(\sum_z^{(i)}) + T(NIZK\text{-}Gen) \approx 1.32X$$

The first step to reconstruct a complete signature on a message M is to find k valid signature fragments. As showed above, the verification of an NIZK proof takes time $T(NIZK\text{-}Ver) \approx 1.37X$: if all users in P are honest, this step takes time roughly $(1.37X) \approx 5.48X$; otherwise the worst-case running-time is approximately $|P|(1.37X) = m(1.37X) \approx 13.7X$.

Once k valid signature fragments are found, the reconstruction of the signature requires the computation of Lagrange interpolation in the exponent (according to Equation 7), followed by the Extended Euclidean algorithm (per Equation 8), and by two further modular exponentiations to the powers $\alpha$ and $\beta$ computed under the Extended Euclidean Algorithm. The cost of Lagrangian interpolation boils down to the time to compute k modular exponentiation with exponent of length at most k log k+k log U:

$$T(Eq.\ 7) \approx kO(k(\log k + \log U)\lambda^2)$$

$$\approx 4O(40\lambda^2)$$

$$\approx 0.16X.$$

For given integers a and b, the Extended Euclidean Algorithm computes s and t s.t. as+bt=d (where d=gcd(a, b)) in time $O(|a||b|)$. The bit-lengths corresponding to the computation of the values $\alpha$ and $\beta$ for Equation 8 are approximately $\lambda$ (for e) and lk log k (for e'), where l is the number of redistributions that have occurred since the initial system setup (which we can bound from above with, for example, 128). Let us denote by Y the time it takes to execute the Extended Euclidean Algorithm on inputs of equal size $\lambda = 1024$. Notice that, on a 1.5 GHz CPU with 1.5 GB RAM, an unoptimized, open-source software implementation leads to value of Y on the order of 0.13 msec.

Computing the values $\alpha$ and $\beta$ for Equation 8 then takes at most:

$$T(Euclid\text{-}Inverse) \approx O(lk \log k\lambda) \approx Y$$

As for the modular exponentiations carried out according to Equation 8 to the powers α and β (whose sizes are bounded by the sizes of the inputs to the previous step, respectively λ and Ik log k), we get $$T(\text{Eq.8}) \approx O(Ik \log k\lambda^2) + O(\lambda^3) \approx 2X$$

Overall, the SIGN procedure takes time:

$$T(\text{SIGN-RECOMBINE}) \approx t \cdot T(\text{NIZK-Ver}) + T(\text{Eq.7}) + T(\text{Euclid-Inverse}) + T(\text{Eq.8})$$

where t is the number of NIZK proofs that the client verifies before obtaining k correct signature fragments. In the best case, t=k, and T(SIGN-RECOMBINE) is 7.64X+Y; in the worst case, t=m, and T(SIGN-RECOMBINE) is 15.86X+Y.

We now analyze the running time of the REDIST procedure. Each user j∈B computes k exponentiations ($g^{fj(0)}$, $g^{fj(a1)}$, ..., $g^{fj(ak-1)}$), each with exponent size λ+k log m and modulus λ:

$$T(g^{fj(\cdot)}) = O((\lambda + k \log m)\lambda^2) = 1.03X$$

$$kT(g^{fj(\cdot)}) = 4.12X$$

To compute its new sub-share, each member i'∈P' first checks the validity of $g^{fj(0)}$ (cf. Equation (3)). This step requires (k+1) exponentiations, each with exponent size k log U:

$$T(\text{Eq.}(3)) = (k+1)O((k \log U)\lambda^2) = 0.20X$$

Next, i' needs to verify the validity of the received new sub-share for each member j∈B (cf. Equation (4)). This step requires k exponentiations, each with exponent size k log U:

$$T(\text{Eq.}(4)) = kO((k \log U)\lambda^2) = 0.16X$$

To generate the new public information, each i'∈P' computes k exponentiations, each with exponent size k log U (cf. Equation (6)), yielding again time:

$$T(\text{Eq.}(6)) = kO((k \log U)\lambda^2) = 0.16X$$

The last step of the REDIST procedure is the generation of a signature fragment on the new value public info, which, as discussed above, requires time roughly:

$$T(\text{PUB-Sign}) = T(\text{SIGN-FRAGMENT}) = 1.32X$$

Overall, the REDIST procedure runs in time:

$$T(\text{REDIST}) = kT(g^{fj(\cdot)}) + T(\text{Eq. }(3)) + T(\text{Eq. }(4)) + $$
$$T(\text{Eq. }(5)) + T(\text{Eq. }(6)) + T(\text{PUB-Sign})$$
$$= 4.12X + 0.20X + 0.16X + 0.16X + 1.32X =$$
$$= 5.96X.$$

FIG. 5 shows a table of micro-benchmarks for the main stages of an embodiment of the present invention. This table assumes a 1.5 GHz CPU with 1.5 GB RAM and assuming a typical choice of parameters for an RSA crypto-system (|p|=|q|=512 bits).

Figure 6:
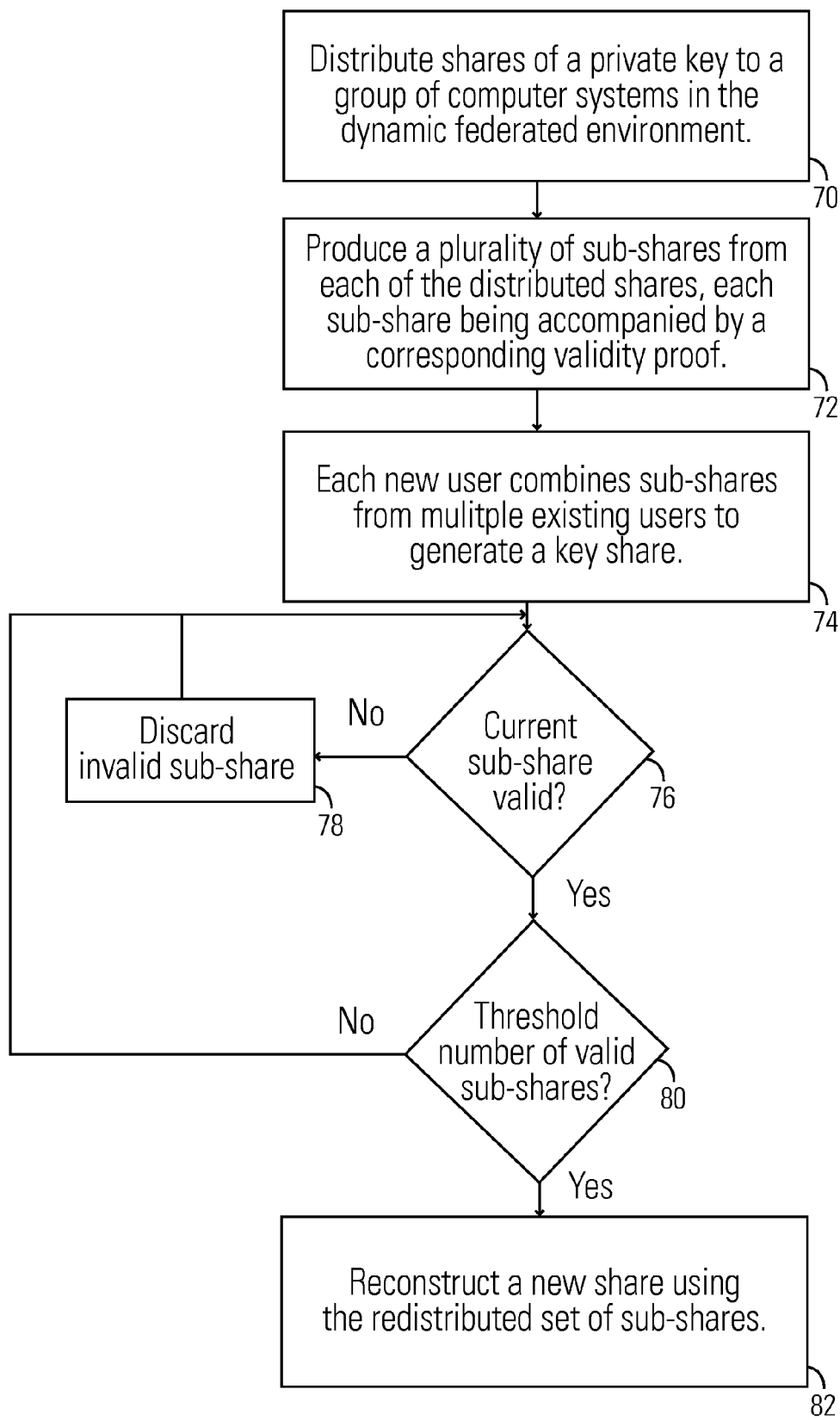
FIG. 6 shows a flowchart of a method for authenticated communication in accordance with an embodiment of the invention.

FIG. 6 shows a flowchart of a process for authenticated communication in dynamic federated environments in accordance with an embodiment of the invention. In step 70 shares of a private key are distributed to a group of computer systems in the dynamic federated environment. In step 72, a plurality of sub-shares are produced from each of the distributed shares, each sub-share comprising a sub-fragment of the private signature key and a corresponding validity proof. The sub-shares from multiple users are combined, to generate a set of new key share, in step 74. Note that each new key share is derived from sub-shares from multiple users. In step 76, the validity of each sub-share in the new set of sub-shares is determined. If the current sub-share is not valid it is discarded, in step 78. If the current sub-share is valid, step 80 determines if the minimum number of valid sub-shares has been received. If not, the process returns to step 76 to determine the validity of the next sub-share. If the minimum number of the redistributed sub-shares has been received, then a new share can be reconstructed using the redistributed set of sub-shares, in step 82.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wire line, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 7:
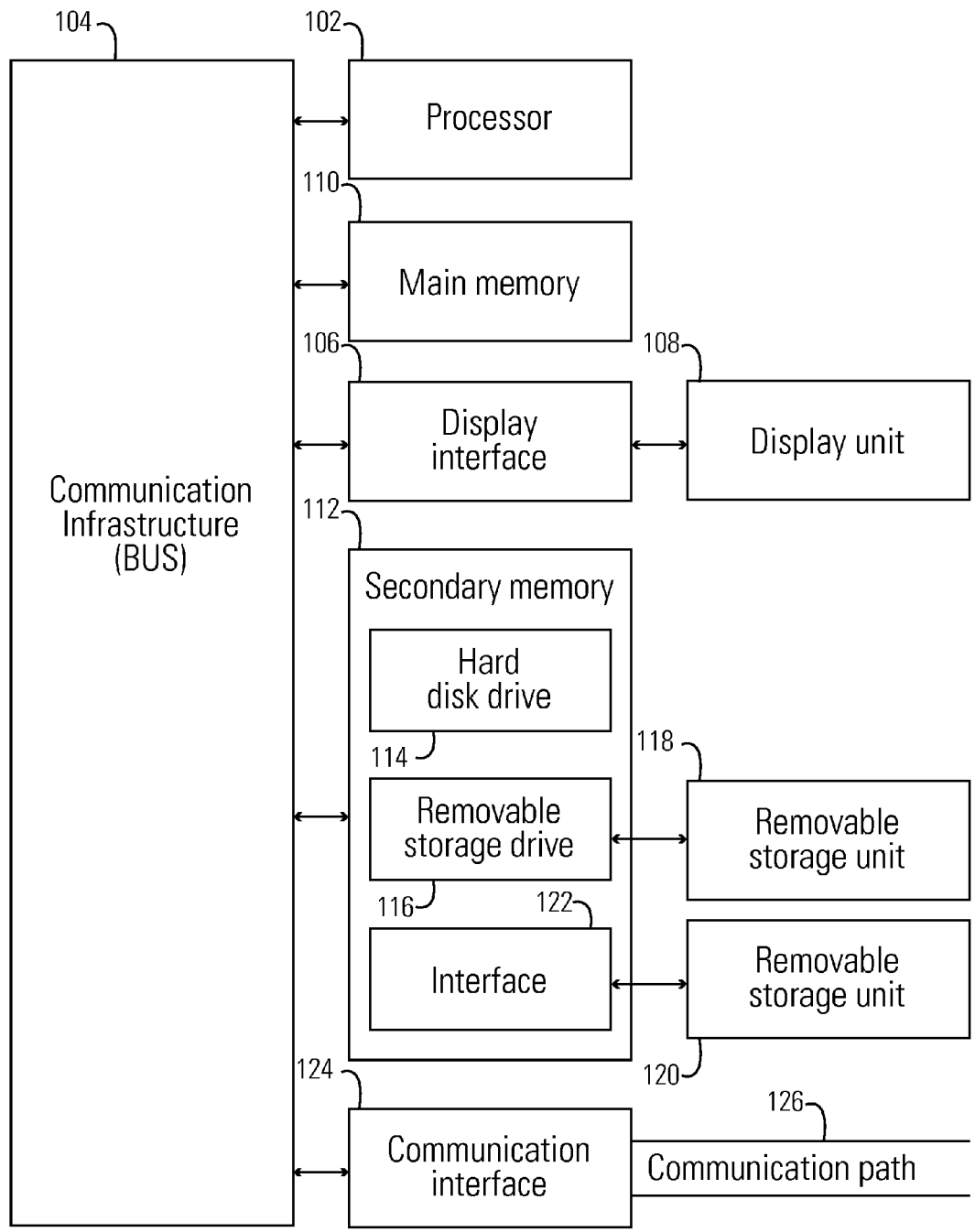
FIG. 7 shows a high level block diagram of an information processing system useful for implementing one embodiment of the present invention.

FIG. 7 is a high level block diagram showing an information processing system useful for implementing one embodiment of the present invention. The computer system includes one or more processors, such as processor 102. The processor 102 is connected to a communication infrastructure 104 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 106 that forwards graphics, text, and other data from the communication infrastructure 104 (or from a frame buffer not shown) for display on a display unit 108. The computer system also includes a main memory 110, preferably random access memory (RAM), and may also include a secondary memory 112. The secondary memory 112 may include, for example, a hard disk drive 114 and/or a removable storage drive 116, representing, for example, a floppy disk drive, a magnetic tape drive, or an optical disk drive. The removable storage drive 116 reads from and/or writes to a removable storage unit 118 in a manner well known to those having ordinary skill in the art. Removable storage unit 118 represents, for example, a floppy disk, a compact disc, a magnetic tape, or an optical disk, etc. which is read by and written to by removable storage drive 116. As will be appreciated, the removable storage unit 118 includes a computer readable medium having stored therein computer software and/or data.

In alternative embodiments, the secondary memory 112 may include other similar means for allowing computer programs or other instructions to be loaded into the computer system. Such means may include, for example, a removable storage unit 120 and an interface 122. Examples of such means may include a program cartridge and cartridge interface (such as that found in video game devices), a removable memory chip (such as an EPROM, or PROM) and associated socket, and other removable storage units 120 and interfaces 122 which allow software and data to be transferred from the removable storage unit 120 to the computer system.

The computer system may also include a communications interface 124. Communications interface 124 allows software and data to be transferred between the computer system and external devices. Examples of communications interface 124 may include a modem, a network interface (such as an Ethernet card), a communications port, or a PCMCIA slot and card, etc. Software and data transferred via communications interface 124 are in the form of signals which may be, for example, electronic, electromagnetic, optical, or other signals capable of being received by communications interface 124. These signals are provided to communications interface 124 via a communications path (i.e., channel) 126. This communications path 126 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 110 and secondary memory 112, removable storage drive 116, and a hard disk installed in hard disk drive 114.

Computer programs (also called computer control logic) are stored in main memory 110 and/or secondary memory 112. Computer programs may also be received via communications interface 124. Such computer programs, when executed, enable the computer system to perform the features of the present invention as discussed herein. In particular, the computer programs, when executed, enable the processor 102 to perform the features of the computer system. Accordingly, such computer programs represent controllers of the computer system.

From the above description, it can be seen that the present invention provides a system, computer program product, and method for implementing the embodiments of the invention. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   distributing shares of a private signature key to a group of users with a first processor;
   producing a plurality of sub-shares from each of said distributed shares with a processor associated with at least one user of the group of users, with each sub-share being accompanied by a corresponding validity proof;
   distributing the plurality of sub-shares among a set of new users, wherein each of the group of users receives sub-shares from a multiple users;
   verifying whether each sub-share in that is received by the each user of the set of new users is valid; and
   combining said valid sub-shares from multiple existing users at each one of the set of new users to generate a set of new shares, each said new share being derived from valid sub-shares from multiple users, wherein, based on said verifying determining that a received sub-share is invalid, said invalid sub-share is not used in said generating.

2. A method according to claim 1 further comprising:
   determining whether a minimum number of said sub-shares have been received by a new user; and
   based on said minimum number having been received, said new user constructing a new share using said valid sub-shares.

3. A method according to claim 1 wherein said validity proof is a non-interactive zero-knowledge validity proof.

4. A method according to claim 1 wherein each said new share includes a corresponding validity proof.

5. A method according to claim 1 further comprising:
   sending said share and corresponding validity proof to a client; and
   said client reconstructing said private signature key by combining said new shares and corresponding validity proofs.

6. A method according to claim 1 wherein said users are computer systems.

7. A method according to claim 1 wherein said users are individual satellites.

8. A system comprising:
   a plurality of computer systems, each of the plurality of computer systems comprising a respective memory and respective processor, the plurality of computer systems configured to:
   distribute shares of a private signature key to a group of users with a first processor;
   produce a plurality of sub-shares from each of said distributed shares with a processor associated with at least one user of the group of users, with each sub-share being accompanied by a corresponding validity proof;
   distribute the plurality of sub-shares among a set of new users, wherein each of the group of users receives sub-shares from a multiple users;
   verify whether each sub-share in that is received by the each user of the set of new users is valid; and
   combine said valid sub-shares from multiple existing users at each one of the set of new users to generate a set of new shares, each said new share being derived from valid sub-shares from multiple users, wherein, based on said verifying determining that a received sub-share is invalid, said invalid sub-share is not used in said generating.

9. A system according to claim 8 wherein said validity proof is a non-interactive zero-knowledge validity proof.

10. A computer program product for authenticating communications, said computer program product comprising:
    a non-transitory computer usable medium having computer usable program code embodied therewith, said computer usable program code comprising: computer usable program code configured to:
    distributing shares of a private signature key to a group of users with a first processor;
    producing a plurality of sub-shares from each of said distributed shares with a processor associated with at least one user of the group of users, with each sub-share being accompanied by a corresponding validity proof;
    distributing the plurality of sub-shares among a set of new users, wherein each of the group of users receives sub-shares from a multiple users;
    verifying whether each sub-share in that is received by the each user of the set of new users is valid; and
    combining said valid sub-shares from multiple existing users at each one of the set of new users to generate a set of new shares, each said new share being derived from valid sub-shares from multiple users, wherein, based on said verifying determining that a received sub-share is invalid, said invalid sub-share is not used in said generating.

* * * * *